(12) United States Patent
Yamaoka

(10) Patent No.: US 8,296,254 B2
(45) Date of Patent: Oct. 23, 2012

(54) DATA FLOW ANALYZING APPARATUS, DATA FLOW ANALYZING METHOD AND DATA FLOW ANALYZING PROGRAM

(75) Inventor: Yuji Yamaoka, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 559 days.

(21) Appl. No.: 12/255,098

(22) Filed: Oct. 21, 2008

(65) Prior Publication Data

US 2009/0106182 A1    Apr. 23, 2009

(30) Foreign Application Priority Data

Oct. 22, 2007    (JP) .................................. 2007-274365

(51) Int. Cl.
*G06N 5/02* (2006.01)
(52) U.S. Cl. ......................................................... 706/47
(58) Field of Classification Search .................... 706/47; 713/200; 726/24
See application file for complete search history.

(56) References Cited

U.S. PATENT DOCUMENTS

2003/0120947 A1*    6/2003    Moore et al. .................. 713/200
2007/0250930 A1*    10/2007    Aziz et al. ....................... 726/24

FOREIGN PATENT DOCUMENTS

JP    6-332750    12/1994

OTHER PUBLICATIONS

Y. Ye, D. Wang, T. Li and D. Ye, "IMDS: Intelligent Malware Detection System," KDD'07 in ACM, pp. 1043-1047, Aug. 2007.*

* cited by examiner

*Primary Examiner* — Jeffrey A Gaffin
*Assistant Examiner* — Ola Olude Afolabi
(74) *Attorney, Agent, or Firm* — Staas & Halsey LLP

(57) ABSTRACT

A data flow analyzing apparatus includes an analysis rule storage which stores analysis rules having definitions of data types, a data flow analyzer which performs data flow analysis on an analysis target program as a target of analysis by using the analysis rules stored in the analysis rule storage to thereby output unsafe data-including procedures as detected points, an analysis rule candidate generator which generates candidates of analysis rules based on the detected points, and an analysis rule candidate output which outputs the analysis rule candidates generated by the analysis rule candidate generator to a predetermined output.

7 Claims, 16 Drawing Sheets

FIG. 1

(1) EXTRACT A DETECTED POINT FROM AN ANALYSIS TARGET PROGRAM BASED ON ANALYSIS RULES

"com.example.C2#p(java.lang.String,int)","14"

(2) GENERATE ADDITIONAL RULE CANDIDATES BASED ON THE DETECTED POINT

- "constant","java.lang.Runtime#getRuntime()",""
- "constant","java.lang.Runtime#exec(java.lang.String)",""
- "constant","java.lang.Process#waitFor()",""
- "constant","com.example.C2#escape(java.lang.String)",""
- "constant","java.lang.String#valueOf(java.lang.Object)",
- "constant","java.lang.StringBuilder#<init>(java.lang.String)",""
- "constant","java.lang.StringBuilder#append(java.lang.String)",""
- "constant","java.lang.StringBuilder#append()",""
- "constant","java.lang.StringBuilder#toString()",""

(3) DISPLAY THE ADDITIONAL RULE CANDIDATES

ADD TO THE RULE "default/recommended/os.csv"

suppression
"com.example.C2#p(java.lang.String,int)"            [ADD THIS PROCEDURE TO "suppression"]

output
0
1                                                    [ADD THIS PROCEDURE ARGUMENT "output"]
2
3 constant
- "constant","java.lang.Runtime#getRuntime()",""
- "constant","java.lang.Runtime#exec(java.lang.String)",""
- "constant","java.lang.Process#waitFor()",""
- "constant","com.example.C2#escape(java.lang.String)",""
- "constant","java.lang.String#valueOf(java.lang.Object)",

[ADD THE SELECTED PROCEDURES TO "constant"]

[Close]

FIG. 3

```
void p(java.lang.String, int)   throws java.io.IOException;
  Code:
   0:    invokestatic          #33; //Method java/lang/Runtime.getRuntime:()Ljava/lang/Runtime;
   3:    astore_3
   4:    ldc           #39; //String command
   6:    astore    4
   8:    goto      73
  11:    aload_3
  12:    aload     4
  14:    invokevirtual         #40; //Method java/lang/Runtime.exec:(Ljava/lang/String;)Ljava/lang/Process;
  17:    astore    5
  19:    aload     5
  21:    invokevirtual         #44; //Method java/lang/Process.waitFor:()I
  24:    pop
  25:    goto      38
  28:    astore    6
  30:    aload     5
  32:    invokevirtual         #50; //Method java/lang/Process.destroy:()V
  35:    aload     6
  37:    athrow
  38:    aload     5
  40:    invokevirtual         #50; //Method java/lang/Process.destroy:()V
  43:    new       #53; //class java/lang/StringBuilder
  46:    dup
  47:    aload_1
  48:    invokestatic          #55; //Method escape:(Ljava/lang/String;)Ljava/lang/String;
  51:    invokestatic          #57; //Method java/lang/String.valueOf:(Ljava/lang/Object;)Ljava/lang/String;
  54:    invokespecial         #61; //Method java/lang/StringBuilder."<init>":(Ljava/lang/String;)V
  57:    ldc           #64; //String
  59:    invokevirtual         #66; //Method java/lang/StringBuilder.append:(Ljava/lang/String;)Ljava/lang/StringBuilder;
  62:    invokestatic          #70; //Method java/lang/System.currentTimeMillis:()J
  65:    invokevirtual         #76; //Method java/lang/StringBuilder.append:(J)Ljava/lang/StringBuilder;
  68:    invokevirtual         #79; //Method java/lang/StringBuilder.toString:()Ljava/lang/String;
  71:    astore    4
  73:    iload_2
  74:    iinc      2, -1
  77:    ifge      11
  80:    goto      85
  83:    astore    4
  85:    return
 Exception table:
  from   to  target type
    19   28   28  any
     4   80   83  Class java/lang/InterruptedException
```

FIG. 4

```
package com.example;

import java.io.IOException;

public class C2 {
        static String escape (String command) {
                return command. replaceAll("[\\p{Space}\\p{Punct}]","_");
        } void p(String command, int n) throws IOException {
                Runtime runtime = Runtime. getRuntime();
                try {
                        String string = "command";
                        while (n-- >= 0) {
                                Process process = runtime.exec (string);
                                try {
                                        process.waitFor ();
                                }
                                finally {
                                        process.destroy ();
                                }
                                string = escape (command) +" "+ System.currentTimeMillis();
                        }
                }
                catch (InterruptedException e) {
                        // ignore
                }
        }
}
```

FIG. 5

"output","java.lang.Runtime#exec(java.lang.String)","1"
"constant","java.lang.System#currentTimeMillis()",""

FIG. 6

"com.example.C2#p(java.lang.String, int)", "14"

FIG. 7

| SOURCE NAME | LINE NUMBER | RULE NAME | PACKAGE NAME | CLASS NAME | METHOD NAME | BYTE POSITION |
|---|---|---|---|---|---|---|
| C1.java | 20 | default/... | com.example | C1 | p1() | 24 |
| C1.java | 9 | default/... | com.example | C1 | p1(java.lang.String) | 26 |

ADJUST RULES FOR THE NEXT TEST...(THE SELECTED LINE IS SET SO THAT THERE IS NO REPORT)

SOURCE CODE C1.java

```
1    package com.example;
2
3    import java.io.IOException;
4
5    public class C1 {
6        static public void p1(String arg) throws IOException {
7            Runtime runtime = Runtime.getRuntime();
8            String s = Inspector.check(arg);
9            runtime.exec("touch "+s);
10       }
11
12       private String string;
13
14       public C1(String arg) {
15           string = arg;
16       }
17
18       public void p1() throws IOException {
19           Runtime runtime = Runtime.getRuntime();
20           runtime.exec("touch "+string);
21       }
22   }
```

BYTE CODE invokevirtual java/lang/Runtime/exec(Ljava/lang/String;)Ljava/lang/Process;

FIG. 9

```
·java.lang.Runtime#getRuntime()(POSITION 0)
·java.lang.Runtime#exec(java.lang.String)(POSITION 14)
·java.lang.Process#waitFor()(POSITION 21)
·java.lang.Process#destroy()(POSITION 40)
·com.example.C2#escape(java.lang.String)(POSITION 48)
·java.lang.String#valueOf(java.lang.Object)(POSITION 51)
·java.lang.StringBuilder#<init>(java.lang.String)(POSITION 54)
·java.lang.StringBuilder#append(java.lang.String)(POSITION 59)
·java.lang.System#currentTimeMillis()(POSITION 62)
·java.lang.StringBuilder#append()(POSITION 65)
·java.lang.StringBuilder#toString()(POSITION 68)
```

⇒

```
·"constant","","java.lang.Runtime#getRuntime()","",
·"constant","","java.lang.Runtime#exec(java.lang.String)","",
·"constant","","java.lang.Process#waitFor()","",
·"constant","","com.example.C2#escape(java.lang.String)","",
·"constant","","java.lang.String#valueOf(java.lang.Object)","",
·"constant","","java.lang.StringBuilder#<init>(java.lang.String)","",
·"constant","","java.lang.StringBuilder#append(java.lang.String)","",
·"constant","","java.lang.StringBuilder#append()","",
·"constant","","java.lang.StringBuilder#toString()","",
```

FIG. 14

```
String s="touch "+input();//IF "|", ";" OR THE LIKE IS INCLUDED IN THE INPUT VALUE,
exec(s);// ANY COMMAND MAY BE DESIGNATED.
```

HERE, exec(...) IS A SUSPICIOUS PROCEDURE (THE FIRST ARGUMENT OF WHICH IS A SUSPICIOUS PROCEDURE ARGUMENT).

FIG. 15

```
String s="touch "+input();
  exec(s);// REPORTABLE
```

FIG. 16

```
String s="touch "+check(input());
    exec(s);// NOT REPORTABLE
```

DATA FLOW ANALYZING APPARATUS, DATA FLOW ANALYZING METHOD AND DATA FLOW ANALYZING PROGRAM

BACKGROUND

Field of the Invention

It has been heretofore necessary to find bugs (e.g. security bugs) in an analysis target program as a target of analysis in order to prevent an erroneous process in the program (see Patent Document 1). It is known that data flow analysis of security bugs is used as a method which is one of methods for finding such bugs and which finds injection type security bugs chiefly.

Such injection type security bugs are latent in a program having a possibility that an input value may be delivered to a suspicious procedure argument. The suspicious procedure argument used herein is an argument of a procedure which designates output contents or an output designation.

As shown in FIG. 14, the injection type security bugs have a problem because an input value "(input( ))" is delivered to data "s" which is a suspicious procedure argument. That is, when a meta character such as "|" or ";" is included in the input value, there is a possibility that any command may be designated.

A data flow analyzing apparatus used for finding such bugs performs data flow analysis according to analysis rules having definitions concerned with data types, etc. In the data flow analyzing apparatus for security bugs, "suspicious procedure definitions" and "checking procedure definitions" are used as the analysis rules. "Suspicious procedure definitions" are definitions of suspicious procedures each of which is treated as a reportable procedure if an argument of the procedure is not safe. "Checking procedure definitions" are definitions of checking procedures such that a return value of a procedure is regarded as being safe (i.e. procedures having return values regarded as being safe). These analysis rules are generated when a user inputs procedures. For example, in the Java (registered trademark) language, analysis rules are generated when fully qualified type names, procedure names and sets of arguments are input.

That is, the data flow analyzing apparatus receives a target program and the analysis rules as input data and outputs reportable detected points. For example, when "exec( . . . )" is defined as a suspicious procedure, unsafe data "input( )" is included as an argument in the suspicious procedure as shown in FIG. 15. On the other hand, when analysis is performed while "check( . . . )" defined as a checking procedure is added to "exec( . . . )" defined as a suspicious procedure, there is no report because the argument in the suspicious procedure is regarded as being safe as shown in FIG. 16.

Incidentally, the aforementioned background art has a problem that generation of analysis rules requires labor and time for inputting procedures because the user needs to input procedures without mistakes in order to generate such analysis rules. Moreover, generation of analysis rules requires labor and time for inputting procedures because the meaning of "safe" varies according to the target program so that it is necessary to generate analysis rules optimized according to the target program.

SUMMARY

According to an aspect of an embodiment, there is provided a data flow analyzing apparatus comprising an analysis rule storage which stores analysis rules having definitions of data types, a data flow analyzer which performs data flow analysis on an analysis target program as a target of analysis by using the analysis rules stored in the analysis rule storage to thereby output unsafe data-including procedures as detected points, an analysis rule candidate generator which generates candidates of analysis rules based on the detected points, and an analysis rule candidate output which outputs the analysis rule candidates generated by the analysis rule candidate generator to a predetermined output.

The above-described embodiments of the present invention are intended as examples, and all embodiments of the present invention are not limited to including the features described above.

BRIEF DESCRIPTION OF THE DRAWINGS

FIG. 1 is a view for explaining the outline and characteristic of a data flow analyzing apparatus according to Embodiment 1;

FIG. 3 is a view for explaining an example (JAVA byte code) of an analysis target program;

FIG. 4 is a view for explaining a source code example (JAVA source code) of the analysis target program;

FIG. 5 is a view for explaining an example of an analysis rule;

FIG. 6 is a view for explaining an example of a detected point;

FIG. 7 is a view for explaining an example of display of the detected point;

FIG. 9 is a view for explaining data generated as additional rule candidates;

FIG. 14 is a view for explaining the background art;

Figure 15:
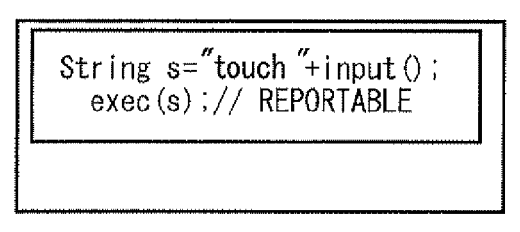

FIG. 15 is a view for explaining the background art; and

FIG. 16 is a view for explaining the background art.

DETAILED DESCRIPTION OF THE PREFERRED EMBODIMENTS

Figure 2:
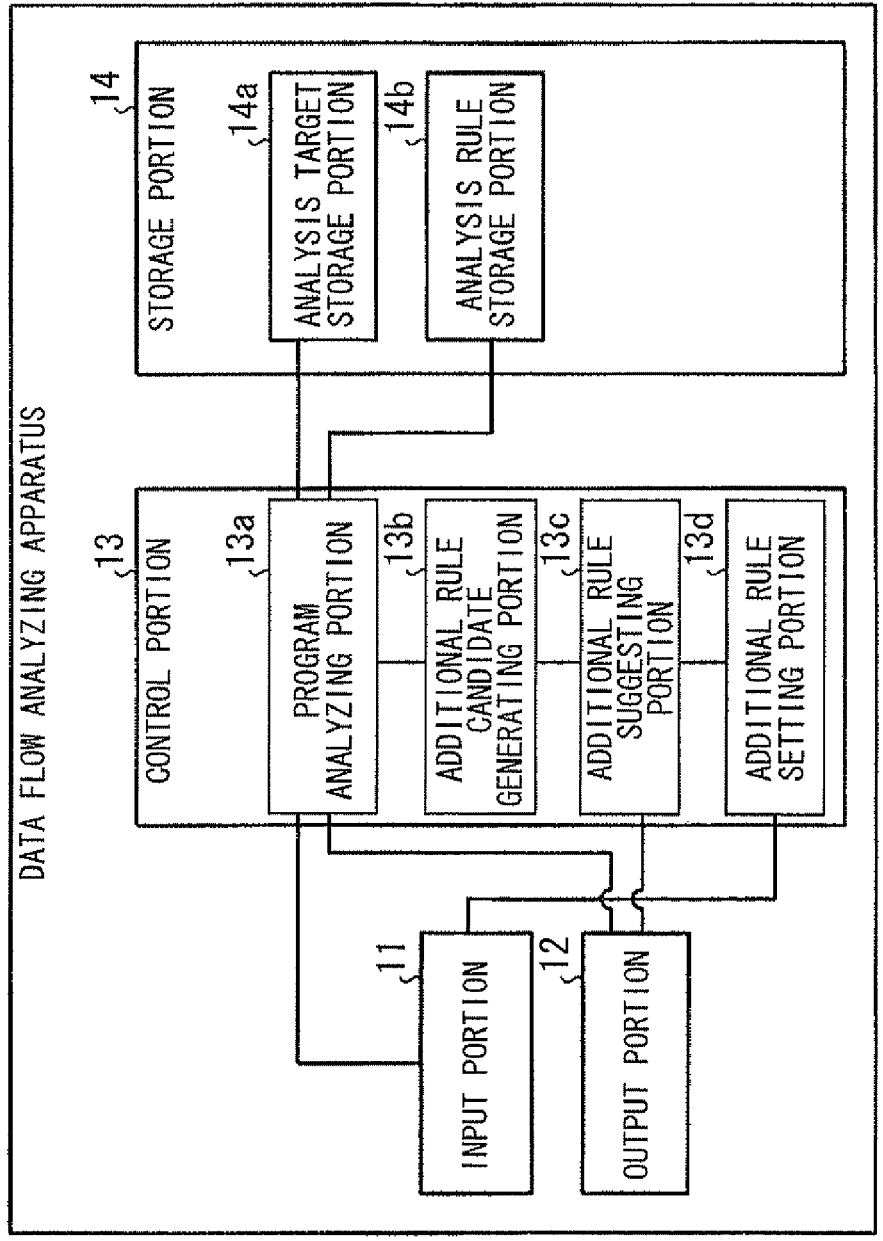
FIG. 2 is a block diagram showing the configuration of the data flow analyzing apparatus according to Embodiment 1.

Reference may now be made in detail to embodiments of the present invention, examples of which are illustrated in the accompanying drawings, wherein like reference numerals refer to like elements throughout.

Embodiments of the present invention as to a data flow analyzing apparatus, a data flow analyzing method and a data flow analyzing program will be described below in detail with reference to the accompanying drawings.

Embodiment 1

The outline and characteristic of the data flow analyzing apparatus according to Embodiment 1 and the configuration and processing flow of the data flow analyzing apparatus will be described successively with respect to FIGS. 1 and 2, and the effect of Embodiment 1 will be described finally in the following description.

Outline and Characteristic of the Data Flow Analyzing Apparatus According to Embodiment 1

Referring first to FIG. 1, the outline and characteristic of the data flow analyzing apparatus according to Embodiment 1 will be described. FIG. 1 is a view for explaining the outline and characteristic of the data flow analyzing apparatus according to Embodiment 1. Incidentally, the following description will be made mainly on the case where additional rule candidates for checking procedures are generated.

The data flow analyzing apparatus 10 according to Embodiment 1 (a configuration of which is shown in FIG. 2) is summarized in that the data flow analyzing apparatus 10 performs data flow analysis on an analysis target program as a target of analysis by using analysis rules having definitions of data types and outputs unsafe data-including procedures as detected points. The data flow analyzing apparatus 10 has a main characteristic in that labor and time for generating such analysis rules is reduced. In the following description, assume that "suppression" expresses a negligible procedure definition candidate, "output" expresses a suspicious procedure definition candidate, and "constant" expresses a checking procedure definition candidate (these will be described later).

Describing this main characteristic specifically, the data flow analyzing apparatus 10 extracts a detected point from an analysis target program based on analysis rules (see (1) in FIG. 1). When description is made in the case of FIG. 1, the data flow analyzing apparatus 10 extracts a detected point <"com.example.C2#p(java.lang.String,int)", "14"> as an unsafe data-including procedure from an analysis target program by using analysis rules.

Then, the data flow analyzing apparatus 10 generates additional rule candidates based on the extracted detected point (see (2) in FIG. 1). Specifically, the data flow analyzing apparatus 10 generates a control flow graph of the procedure at the detected point and extracts all procedure calls from nodes which are reachable in tracing back the control flow graph from the location of the detected point. The data flow analyzing apparatus 10 then extracts all procedure calls from the extracted set of procedures. Successively, the data flow analyzing apparatus 10 excludes duplicate procedures, defined procedures in checking procedure definitions of analysis rules and procedures having no return value from the extracted set of procedures and generates the remaining set of procedures as additional rule candidates.

Then, the data flow analyzing apparatus 10 displays the generated additional rule candidates (see (3) in FIG. 1). Specifically, as shown in FIG. 1, when some candidates are selected from a list in the "constant" frame and a button "add selected procedures to constant" is pushed, the data flow analyzing apparatus 10 sets the selected procedures as checking procedures and adds definitions of the checking procedures as new analysis rules.

In this manner, the data flow analyzing apparatus 10 suggests additional analysis rules automatically, so that labor and time for generating analysis rules can be reduced as described above in the main characteristic.

Configuration of the Data Flow Analyzing Apparatus

The configuration of the data flow analyzing apparatus will be described next with reference to FIG. 2. FIG. 2 is a block diagram showing the configuration of the data flow analyzing apparatus 10 according to Embodiment 1. As shown in FIG. 2, the data flow analyzing apparatus 10 has an input 11, an output 12, a controller 13, and a storage 14. Processing in each component will be described below.

Figure 10:
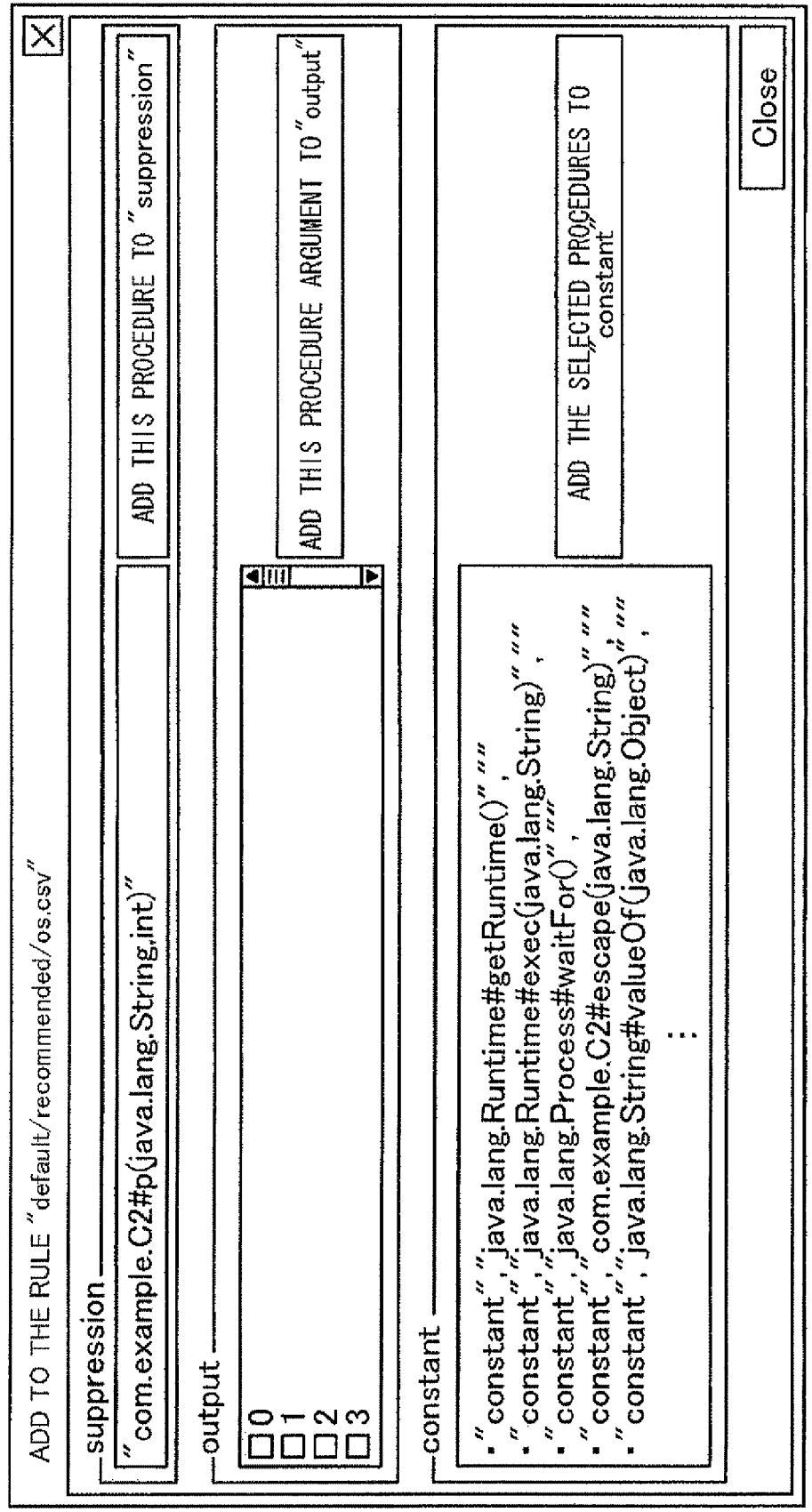
FIG. 10 is a view for explaining an example of display of the additional rule candidates.

The input 11 is provided to input an instruction to start data flow analysis, an instruction to select an additional rule candidate and add the selected candidate as a new analysis rule, etc. The input 11 has a keyboard, a mouse, etc. The output 12 is provided to display detected points and additional rule candidates. The output 12 has a monitor (or a display or a touch panel), and a speaker. For example, the output 12 outputs detected points and additional rule candidates as shown in FIGS. 7 and 10 (details will be described later).

The storage 14 stores data and programs necessary for various processes performed by the controller 13. The storage 14 has an analysis target storage 14a and an analysis rule storage 14b which are particularly closely related to the present invention.

The analysis target storage 14a stores an analysis target program as a target of analysis. Describing a specific example, the analysis target storage 14a stores Java byte codes of a procedure "com.example.C2#p(java.lang.String, int)" as shown in FIG. 3.

In FIG. 3, an integer value written in the beginning of each line in an area "Code" corresponds to a byte code, and each line in an area "Exception table" corresponds to transition definition data at exception handling. For example, "4 80 83 Class java/lang/InterruptedException" means that control is shifted to a location 83 when exception of a type "java.lang.InterruptedException" and sub-types thereof occurs in a location range of 4 (inclusive) to 80 (not inclusive).

The analysis target storage 14a (shown in FIG. 2) stores source codes of an analysis target program as shown in FIG. 4. The source codes of the analysis target program shown in FIG. 4 correspond to the byte codes shown in FIG. 3.

The analysis rule storage 14b (shown in FIG. 2) stores analysis rules having definitions of data types. Specifically, the analysis rule storage 14b stores a negligible procedure definition "suppression", a suspicious procedure definition "output" and a checking procedure definition "constant" as analysis rules. The negligible procedure definition "suppression" is a rule for definition of a negligible procedure (a procedure regarded as being safe regardless of the environment), so that there is no problem report in this procedure. The suspicious procedure definition "output" is a rule for definition of a suspicious procedure, so that a problem is reported if an argument of the procedure is not safe. The checking procedure definition "constant" is a rule for definition of a checking procedure (a procedure having a return value regarded as being safe), so that a return value of the procedure is regarded as being safe.

Describing a specific example, an analysis rule stored in the analysis rule 14b is written in the CSV format as shown in FIG. 5. Data in respective columns of an analysis rule are "rule type" expressing the type of each rule, "procedure designation" expressing the name of each procedure (inclusive of a fully qualified name and a set of arguments) and "argument designation" expressing a set of ordinal numbers of arguments. For example, <"output", "java.lang.Runtime#exec(java.lang.String)", "1"> means that a first argument of an OS command issuing procedure exec(java.lang.String) in a Java standard library java.lang.Runtime is defined as a suspicious procedure argument. Incidentally, the double quotation marks <""> are provided to clarify delimitation of column data in the CSV format.

The controller 13 (shown in FIG. 2) has an internal memory for storing programs defining various processing procedures, etc. and required data and executes various processes based on the programs and required data. The controller 13 has a program analyzer 13a, an additional rule candidate generator 13*b*, an additional rule suggester 13*c* and an additional rule setter 13*d* which are particularly closely related to the present invention.

Figure 6:
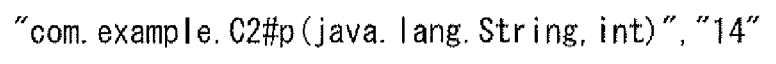

The program analyzer 13*a* (shown in FIG. 2) performs data flow analysis by using an analysis target program stored in the analysis target storage 14*a* and analysis rules stored in the analysis rule storage 14*b* and extracts detected points which are problematic. Specifically, the program analyzer 13*a* extracts a detected point <"com.example.C2#p(java. lang. String,int)", "14"> as shown in FIG. 6 and informs the additional rule candidate generator 13*b* of the detected point. Each detected point is written in the CSV format. Data in respective columns are "procedure name" expressing the name of a procedure corresponding to the detected point, and "in-procedure point" expressing a location which is in the procedure corresponding to the detected point and which is a byte code location in terms of Java class file.

Then, the program analyzer 13*a* displays detected points as shown in FIG. 7. In FIG. 7, two detected points are displayed. When either of the detected points is selected by the user, the additional rule candidate generator 13*b* which will be described later generates analysis rule candidates based on the selected detected point.

The program analyzer 13*a* uses a commonly known data flow analyzing method as a method of performing data flow analysis of a language such as Java (e.g. see Reiji Fujimori "Proposal and Realization of Security Analyzing Algorithm in Object-oriented Program" (master's thesis), Osaka University, 2001").

To satisfy input-output requirements for the commonly known data flow analyzing method, the Java class file is analyzed so that the suspicious procedure is set as a "method corresponding to the output" and each of procedures except the checking procedure is set as a "method corresponding to the input" (however, a procedure (a method such as java. lang.StringBuilder) used for connection of character strings in the class file is not set so). The program analyzer 13*a* performs processing of "method call sentences" in the format of the detected point only on "high" output procedures except negligible procedures while extending it so that return values of checking procedures become "low".

The additional rule candidate generator 13*b* (shown in FIG. 2) generates additional rule candidates based on each detected point. Specifically, the additional rule candidate generator 13*b* generates a control flow graph of the procedure at the detected point and extracts all procedure calls from nodes which are reachable in tracing back the control flow graph from the location of the detected point. Then, the additional rule candidate generator 13*b* extracts all procedure calls from the extracted set of procedures, excludes duplicate procedures, defined procedures in checking procedure definitions of analysis rules and procedures having no return value from the extracted set of procedures, generates the remaining set of procedures as additional rule candidates and informs the additional rule suggester 13*c* of the additional rule candidates.

Figure 8:
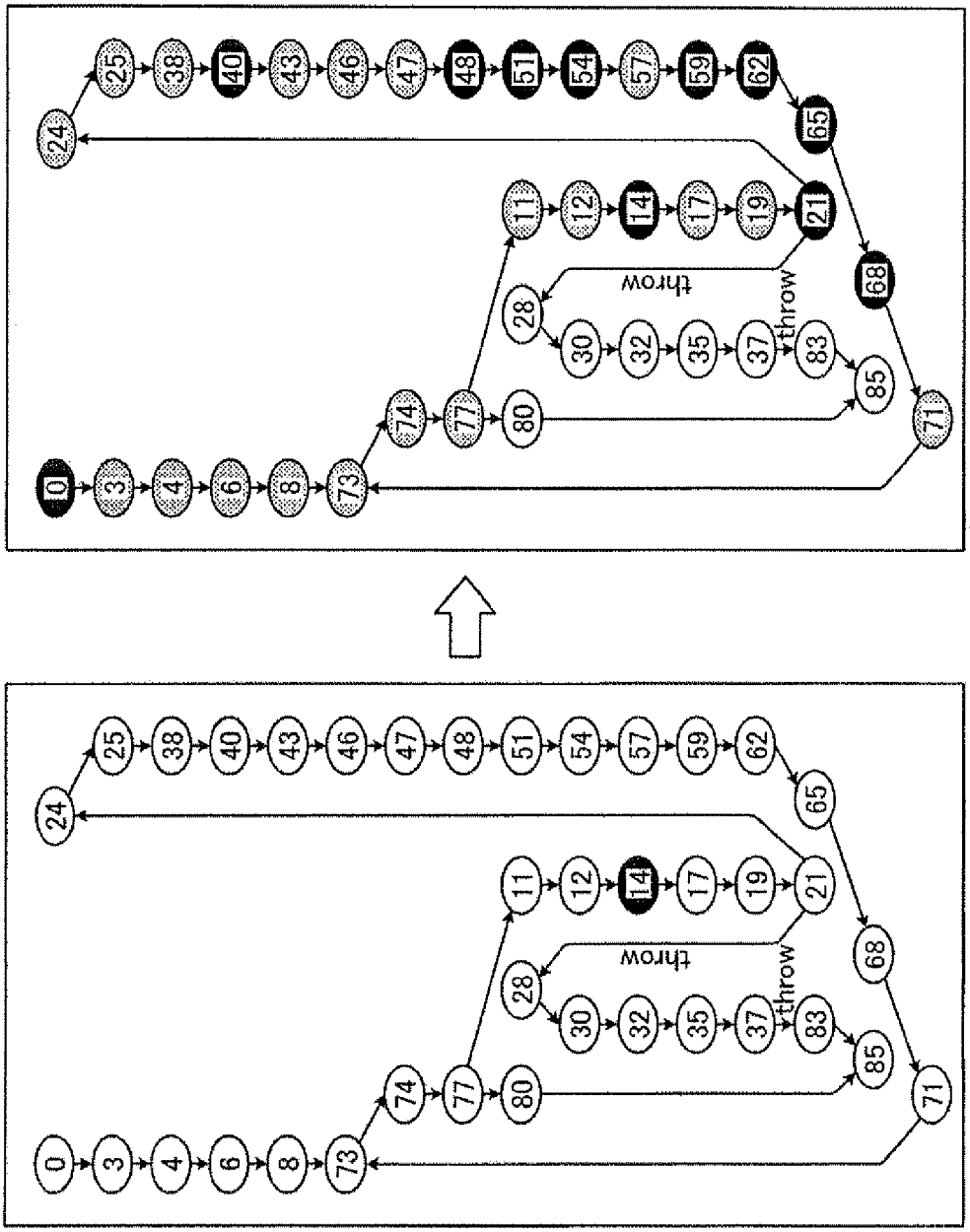
FIG. 8 is a view for explaining an example of extraction from a control flow graph.

Extraction of procedures from a control flow graph will be described below with reference to FIG. 8. As shown in FIG. 8, the additional rule candidate generator 13*b* (shown in FIG. 2) generates a control flow graph of the procedure at the detected point. Then, the additional rule candidate generator 13*b* extracts all procedure calls from nodes which are reachable in tracing back the control flow graph from the location "14" of the detected point. This extraction is equivalent to extraction of all procedure calls called before the location "14" of the suspicious procedure call. In FIG. 8, extracted nodes are colored while nodes of procedure calls in the extracted nodes are blackened.

Generation of additional rule candidates will be described specifically with reference to FIG. 9. As shown in FIG. 9, the additional rule candidate generator 13*b* excludes duplicate procedures, defined procedures in checking procedure definitions of analysis rules and procedures having no return value from the extracted set of procedures. That is, in FIG. 9, the additional rule candidate generator 13*b* excludes <java.lang.System#currentTimeMillis( )> because of the presence of the procedure as a checking procedure definition in analysis rules (see FIG. 5), and excludes <java.lang.Process#destroy( )> because the procedure has no return value (a void type). Then, the additional rule candidate generator 13*b* generates the remaining set of procedures as additional rule candidates.

The additional rule suggester 13*c* (shown in FIG. 2) displays the generated additional rule candidates on the output 12. Specifically, the additional rule suggester 13*c* displays the generated additional rule candidates as shown in FIG. 10. When some procedures are selected from a list in the "constant" frame and a button "add selected procedures to constant" is pushed, the additional rule suggester 13*c* sets the selected procedures as checking procedures and adds definitions of the checking procedures as new analysis rules. When a button "add this procedure to suppression" in the "suppression" frame is pushed, the additional rule suggester 13*c* adds definition of this negligible procedure as a new analysis rule.

When one of check boxes followed by numbers in the "output" frame is ticked and a button "add this procedure to output" is pushed, the additional rule suggester 13*c* adds definition of a suspicious procedure having a suspicious argument designated by the selected number as a new analysis rule.

The additional rule setter 13*d* (shown in FIG. 2) adds the additional rule candidates as new analysis rules. Specifically, upon reception of an instruction to add the additional rule candidates as new analysis rules (see FIG. 10), the additional rule setter 13*d* performs setting so that the additional rule candidates are added as new analysis rules.

Processing by Data Flow Analyzing Apparatus

Figure 11:
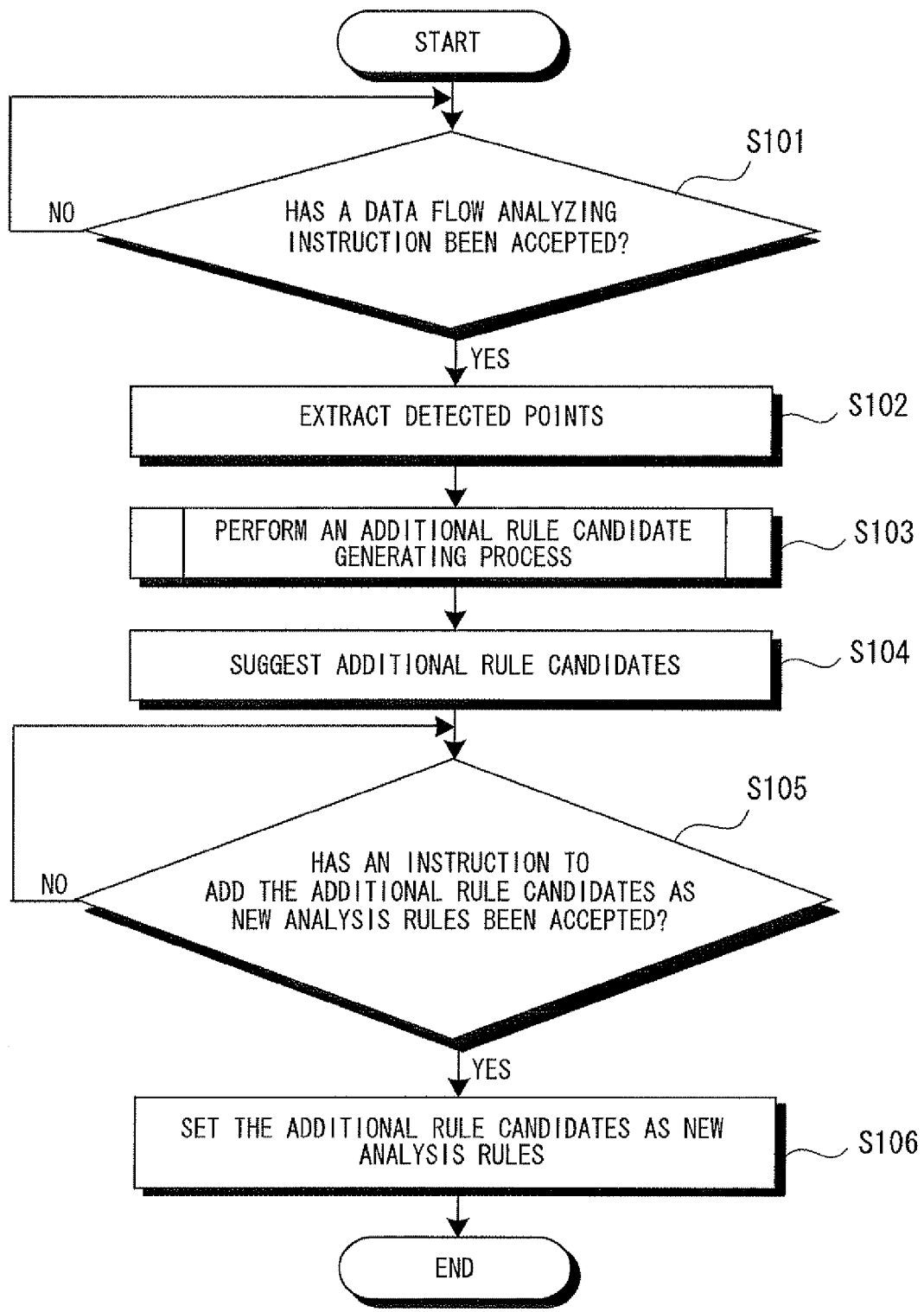
FIG. 11 is a flow chart showing a processing operation of the data flow analyzing apparatus according to Embodiment 1.
Figure 12:
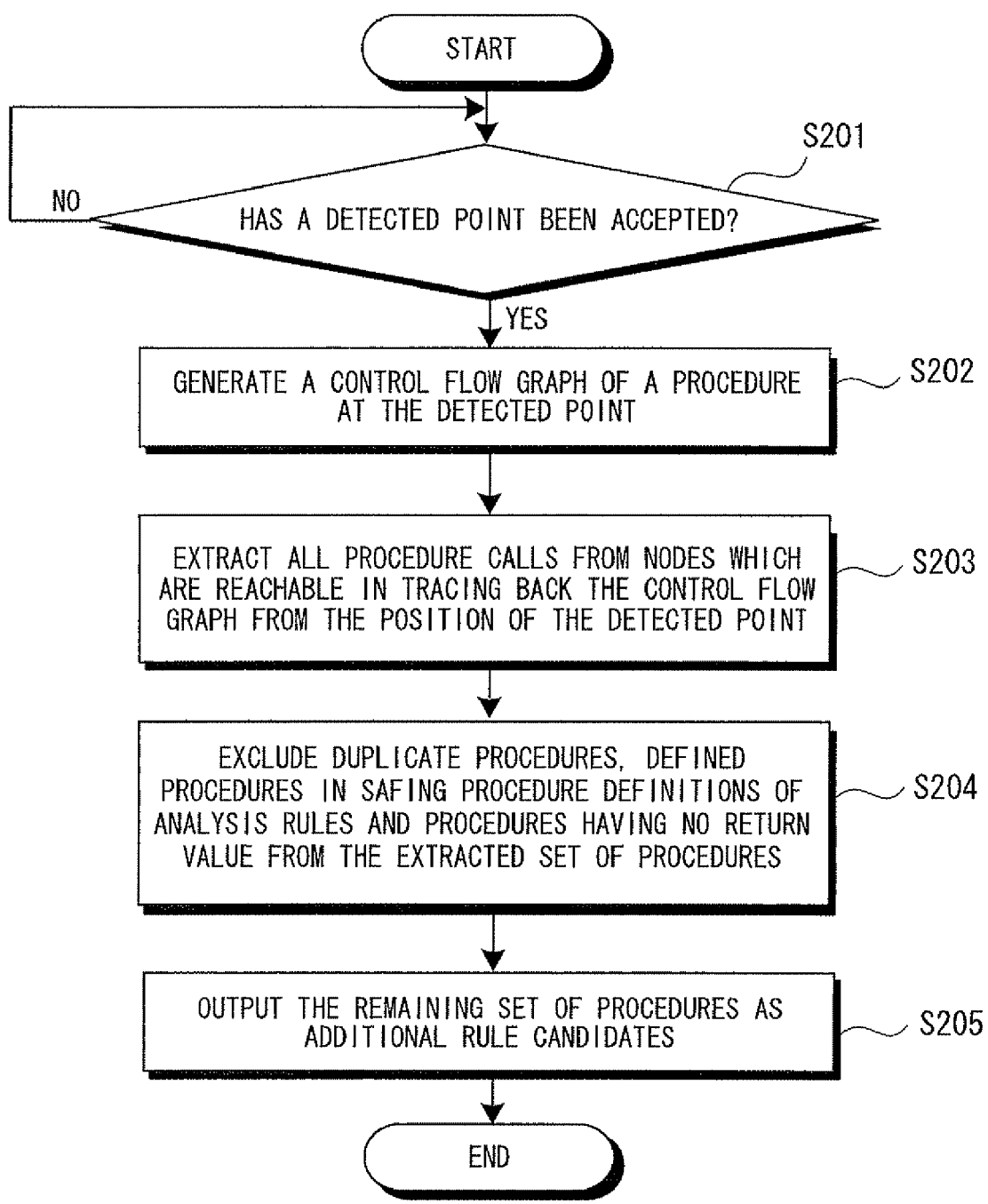
FIG. 12 is a flow chart for explaining an additional rule candidate generation processing sequence in the data flow analyzing apparatus according to Embodiment 1.

Processing performed by the data flow analyzing apparatus 10 according to Embodiment 1 will be described below with reference to FIGS. 11 and 12. FIG. 11 is a flow chart showing a processing operation of the data flow analyzing apparatus 10 according to Embodiment 1. FIG. 12 is a flow chart for explaining a processing sequence in an additional rule candidate generating process of the data flow analyzing apparatus according to Embodiment 1.

As shown in FIG. 11, when the data flow analyzing apparatus 10 (shown in FIG. 2) accepts a data flow analyzing instruction (operation S101: Yes), the data flow analyzing apparatus 10 extracts detected points from an analysis target program based on analysis rules (operation S102). Then, the data flow analyzing apparatus 10 performs an additional rule candidate generating process (which will be described later in detail with reference to FIG. 12) for generating additional rule candidates based on the extracted detected points (operation S103).

Then, the data flow analyzing apparatus 10 displays the generated additional rule candidates (operation S104). When the data flow analyzing apparatus 10 accepts an instruction to add additional rule candidates as new analysis rules (operation S105: Yes), the data flow analyzing apparatus 10 performs setting to add the additional rule candidates as new analysis rules (operation S106).

A processing sequence in the additional rule candidate generating process of the data flow analyzing apparatus 10 will be described next with reference to FIG. 12. As shown in FIG. 12, when the data flow analyzing apparatus 10 (shown in FIG. 2) accepts a detected point (operation S201), the data flow analyzing apparatus 10 generates a control flow graph of a procedure at the detected point (operation S202) and extracts all procedure calls from nodes which are reachable in tracing back the control flow graph from the location of the detected point (operation S203).

Then, the data flow analyzing apparatus 10 extracts all procedure calls from the extracted set of procedures, excludes duplicate procedures, defined procedures in checking procedure definitions of analysis rules and procedures having no return value from the extracted set of procedures (operation S204) and generates the remaining set of procedures as additional rule candidates (operation S205).

Effect of Embodiment 1

As described above, since the data flow analyzing apparatus 10 generates analysis rule candidates based on detected points and outputs the generated analysis rule candidates to the output 12, additional candidates of analysis rules can be suggested automatically so that labor and time for generating analysis rules can be reduced.

Embodiment 2

Although an embodiment of the invention has been described, the invention may be carried out in various other different embodiments than the aforementioned embodiment. Therefore, another embodiment included as Embodiment 2 in the invention will be described below.

(1) System Configuration, Etc.

Since respective constituent members of each of the apparatuses shown in the drawings are functionally conceptual, each apparatus need not be physically configured as shown in the drawings. That is, the specific form of distribution or integration of the respective apparatuses is not limited to the form shown in the drawings, so that all or part of the apparatuses can be distributed or integrated functionally and physically in terms of any unit in accordance with various kinds of loads, situations of use, etc. For example, the program analyzer 13a (shown in FIG. 2) and the additional rule candidate generator 13b may be integrated with each other. All or part of each processing function performed by each apparatus can be achieved by a CPU and a program analyzed and executed by the CPU or can be achieved as hardware based on a wired logic.

As for the respective processes described above in the embodiment, all or part of some process described on the assumption that the process is performed automatically may be performed manually or all or part of some process described on the assumption that the process is performed manually may be performed automatically by a commonly known method. In addition, information including a processing sequence, a control sequence, specific names and various kinds of data and parameters described in the aforementioned document and drawings may be changed arbitrarily except special notes.

(2) Program

Figure 13:
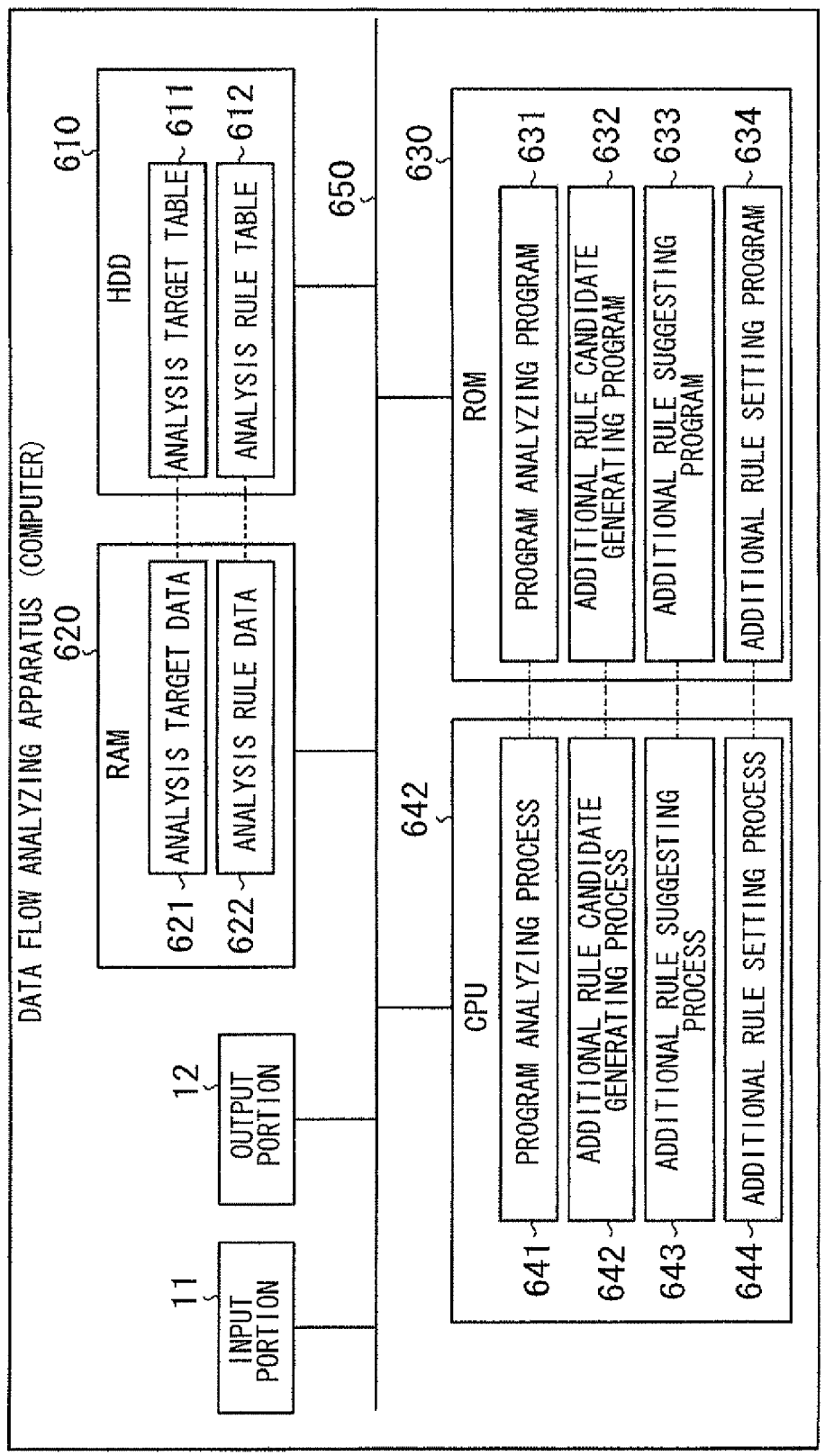
FIG. 13 is a diagram showing a computer which executes a data flow analyzing program.

Incidentally, various processes described in the aforementioned embodiment can be achieved when a program prepared in advance is executed by a computer. Therefore, an example of a computer executing a program having the same function as that of the aforementioned embodiment will be described below with reference to FIG. 13. FIG. 13 is a diagram showing a computer which executes a data flow analyzing program.

As shown in FIG. 13, the computer 600 as a data flow analyzing apparatus includes an input 11, an output 12, an HDD 610, an RAM 620, an ROM 630, and a CPU 640. The respective parts 11 to 640 are connected to one another by a bus 650.

A data flow analyzing apparatus having the same function as that of the aforementioned embodiment is stored in the ROM 630 in advance. That is, as shown in FIG. 13, a program analyzing program 631, an additional rule candidate generating program 632, an additional rule suggesting program 633 and an additional rule setting program 634 are stored in the ROM 630 in advance. Incidentally, the programs 631 to 634 may be integrated or distributed appropriately in the same manner as the respective constituent members of the data flow analyzing apparatus shown in FIG. 2.

When the CPU 640 reads these programs 631 to 634 from the ROM 630 and executes these programs 631 to 634, the respective programs 631 to 634 serve as a program analyzing process 641, an additional rule candidate generating process 642, an additional rule suggesting process 643 and an additional rule setting process 644 as shown in FIG. 13. The processes 641 to 644 correspond to the program analyzer 13a, the additional rule candidate generator 13b, the additional rule suggester 13c and the additional rule setter 13d, respectively, shown in FIG. 2.

As shown in FIG. 13, an analysis target table 611 and an analysis rule table 612 are provided in the HDD 610. The analysis target table 611 and the analysis rule table 612 correspond to the analysis target storage 14a and the analysis rule storage 14b, respectively, shown in FIG. 2. The CPU 640 registers data in the analysis target table 611 and the analysis rule table 612, reads analysis target data 621 and analysis rule data 622 from the analysis target table 611 and the analysis rule table 612, stores the data 621 and 622 in the RAM 620 and executes processing based on the analysis target data 621 and the analysis rule data 622 stored in the RAM 620.

As described above, the data flow analyzing apparatus, the data flow analyzing method and the data flow analyzing program according to the aforementioned embodiment are useful when data flow analysis of an analysis target program as a target of analysis is performed by use of analysis rules having definitions of data types so that unsafe data-including procedures are output as detected points. Particularly, the data flow analyzing apparatus, the data flow analyzing method and the data flow analyzing program according to the aforementioned embodiment are suitable for reducing labor and time for generating analysis rules.

Although a few preferred embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A data flow analyzing apparatus comprising:
   an analysis rule storage which stores analysis rules having definitions of data types;
   a data flow analyzer which performs data flow analysis on an analysis target program as a target of analysis by using the analysis rules stored in the analysis rule storage to thereby output unsafe data-including procedures as detected points;
   an analysis rule candidate generator which generates candidates of analysis rules by selecting a point from among the detected points and generating a control flow graph of the procedure at the point and extracting procedure calls from nodes which are reachable in tracing back the control flow graph from the location of the point; and an analysis rule candidate output which outputs the analysis rule candidates generated by the analysis rule candidate generator to a predetermined output.

2. A data flow analyzing apparatus according to claim 1, wherein the analysis rule candidate generator generates procedures called before a location of the detected point as candidates of analysis rules.

3. A data flow analyzing apparatus according to claim 2, wherein the analysis rule candidate generator excludes procedures having no return value from the procedures called before a location of the detected point and generates the remaining procedures as candidates of analysis rules.

4. A data flow analyzing apparatus according to claim 1, wherein the analysis rule candidate generator generates at least one member selected from the group consisting of checking procedure definition candidates, suspicious procedure candidates and negligible procedure definition candidates as the analysis rule candidates.

5. A data flow analyzing apparatus according to claim 1, further comprising:
an analysis rule additional acceptor which accepts analysis rule candidates to be added as analysis rules from the analysis rule candidates output from the analysis rule candidate output; and
an additional rule setter which sets the analysis rule candidates accepted by the analysis rule additional acceptor so as to be added as analysis rules.

6. A data flow analyzing method comprising:
reading analysis rules having definitions of data types from an analysis rule storage;
performing data flow analysis on an analysis target program as a target of analysis by using the analysis rules;
outputting unsafe data-including procedures as detected points;
generating candidates of analysis rules by an analysis rule candidate generator by selecting a point from among the detected points and generating a control flow graph of the procedure at the point and extracting procedure calls from nodes which are reachable in tracing back the control flow graph from the location of the point; and
outputting the analysis rule candidates generated by the analysis rule candidate generator to a predetermined output.

7. A non-transitory computer-readable recording medium on which a program of a data flow analyzing method to be executed by a computer has been recorded, the method comprising the operations of:
reading analysis rules having definitions of data types from an analysis rule storage;
performing data flow analysis on an analysis target program as a target of analysis by using the analysis rules;
outputting unsafe data-including procedures as detected points; generating candidates of analysis rules by an analysis rule candidate generator points by selecting a point from among the detected points and generating a control flow graph of the procedure at the point and extracting procedure calls from nodes which are reachable in tracing back the control flow graph from the location of the point; and
outputting the analysis rule candidates generated by the analysis rule candidate generator to a predetermined output.

* * * * *

UNITED STATES PATENT AND TRADEMARK OFFICE
CERTIFICATE OF CORRECTION

PATENT NO. : 8,296,254 B2
APPLICATION NO. : 12/255098
DATED : October 23, 2012
INVENTOR(S) : Yuji Yamaoka Page 1 of 1

It is certified that error appears in the above-identified patent and that said Letters Patent is hereby corrected as shown below:

In the Claims

Column 10, Line 24, In Claim 7, after "generator" delete "points".

Signed and Sealed this
Twenty-eighth Day of May, 2013

Teresa Stanek Rea
*Acting Director of the United States Patent and Trademark Office*